(12) United States Patent
Tsuchida et al.

(10) Patent No.: US 9,432,309 B2
(45) Date of Patent: Aug. 30, 2016

(54) TRANSMISSION DEVICE CONTROL SYSTEM

(75) Inventors: Osamu Tsuchida, Hitachi (JP); Yoshinori Sunaga, Hitachinaka (JP); Noribumi Kobayashi, Kitaibaraki (JP)

(73) Assignee: HITACHI METALS, LTD., Tokyo (JP)

( * ) Notice: Subject to any disclaimer, the term of this patent is extended or adjusted under 35 U.S.C. 154(b) by 1147 days.

(21) Appl. No.: 13/449,601

(22) Filed: Apr. 18, 2012

(65) Prior Publication Data

US 2012/0271930 A1 Oct. 25, 2012

(30) Foreign Application Priority Data

Apr. 22, 2011 (JP) .................................. 2011-095926

(51) Int. Cl.
*H04L 12/931* (2013.01)
*H04L 12/24* (2006.01)

(52) U.S. Cl.
CPC ........... *H04L 49/40* (2013.01); *H04L 41/0213* (2013.01); *H04L 41/0803* (2013.01); *H04L 41/22* (2013.01)

(58) Field of Classification Search
None
See application file for complete search history.

(56) References Cited

U.S. PATENT DOCUMENTS

| | | | |
|---|---|---|---|
| 6,735,431 B1* | 5/2004 | Tsunami et al. | 455/414.2 |
| 2002/0136192 A1* | 9/2002 | Holma | H04W 52/265 370/347 |
| 2004/0206539 A1 | 10/2004 | Saito | |
| 2006/0077251 A1* | 4/2006 | Pulitzer | 348/14.01 |
| 2007/0223939 A1* | 9/2007 | Arimoto | 398/198 |
| 2008/0183909 A1* | 7/2008 | Lim et al. | 710/14 |

FOREIGN PATENT DOCUMENTS

| | | |
|---|---|---|
| JP | 2003-32322 A | 1/2003 |
| JP | 2008-118349 A | 5/2008 |
| WO | WO 03/055144 A1 | 7/2003 |

OTHER PUBLICATIONS

Japanese Office Action dated Feb. 21, 2014 (and English translation thereof) in counterpart Japanese Application No. 2011-095926.

* cited by examiner

*Primary Examiner* — Angela Nguyen
(74) *Attorney, Agent, or Firm* — Holtz, Holtz & Volek PC

(57) ABSTRACT

A control computer 82 of a transmission device control system 80 transmits a predetermined command to a network switch 26 by using a user interface 136 for controlling the network switch 26, and a controller 88 of the network switch 26 transmits a control signal to a controller 66 of a transmission device 28 based on the command from the control computer 82.

20 Claims, 17 Drawing Sheets

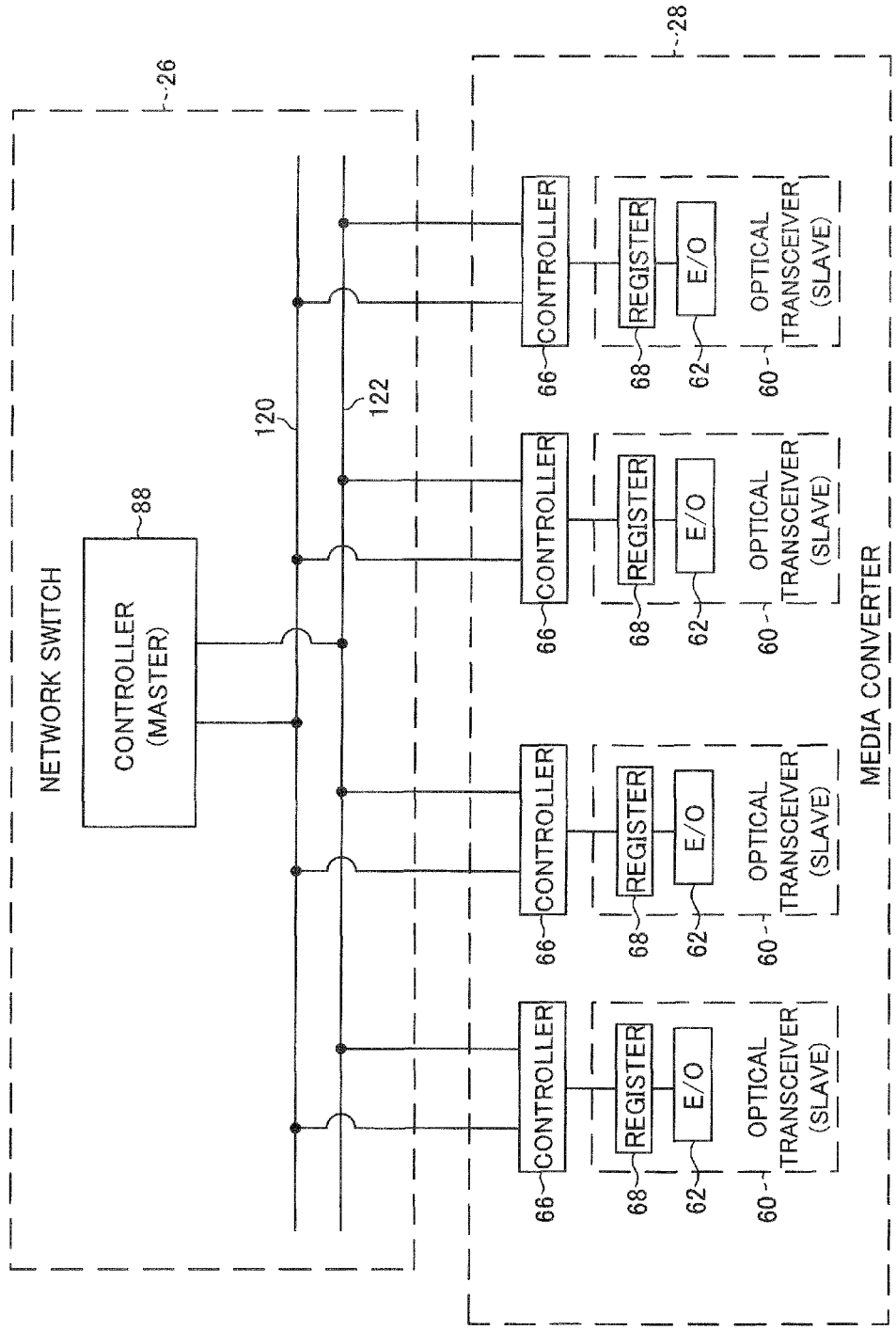

Fig.7

```
(config)# interface port 1/25,1/27,1/29,1/31     ⎫
(config-if-port)# link-aggregattion 1             ⎬ 1st PARAGRAPH
(config-if-port)# exit                            ⎭

(config)# damc database                           ⎫
(config-damc)# damc 1 description ABCDEFG         ⎪
(config-damc)# damc 1 manage-port 1/1             ⎪
(config-damc)# damc 1 wdm-type HIJKLMN            ⎪
(config-damc)# damc 1 data-port 1 1/25            ⎬ 2nd PARAGRAPH
(config-damc)# damc 1 data-port 2 1/27            ⎪
(config-damc)# damc 1 data-port 3 1/29            ⎪
(config-damc)# damc 1 data-port 4 1/31            ⎪
(config-damc)# exit                               ⎪
(config)# exit                                    ⎭
```

3rd PARAGRAPH:

```
# show damc status 1
 DAMC (Direct Attached Media Converter)
  No.1 [ABCDEFG]
    WDM-  WDM-    MC-   MC-         MC-         SW-    SW-
    Type  Port    Port  Link(LH)    Link(User)  Link   Port
    -----------------------------------------------------------
          TX(59)  1 TX  Down        Up          Up     1/25
    HIJK  RX(36)  1 RX
    LMN   TX(57)  2 TX  Up          Up          Up     1/27
          RX(32)  2 RX
          TX(51)  3 TX  Up          Up          Up     1/29
          RX(29)  3 RX
          TX(46)  4 TX  Up          Up          Up     1/31
          RX(20)  4 RX
```

TRANSMISSION DEVICE CONTROL SYSTEM

BACKGROUND OF THE INVENTION

1. Field of the Invention

The present invention relates to a transmission device control system.

2. Description of the Related Art

Media converters are mainly used for long-distance transmission of data. At least two media converters making a pair are disposed between network switches.

For controlling media converters, control ports are provided in the media converters. Control computers are connected to the control ports of the media converters via communication cables (see, for example, Japanese Patent Application Laid-open No. 2003-32322).

Further, for controlling the network switches, control ports are provided also in the network switches. Control computers are connected to the control ports of the network switches via communication cables.

The control computers of the media converters and the control computers of the network switches may be common. In this case, the control computers are connected to the control ports of the media converters and the control ports of the network switches via a control network.

The media converters and the network switches are different in user interface used by an administrator to execute the control. Concretely, the media converters and the network switches are different in command character strings of command line interfaces and in input format thereof. Therefore, the control of the media converters has been performed by administrators of the media converters, and the control of the network switches has been performed by administrators of the network switches.

In recent years, in data centers, studies have been made on a network configuration in which data centers at two places distant from each other are connected via media converters. In the data centers, network switches are generally used. Therefore, administrators of the data centers are accustomed to using the specifications of user interfaces of the network switches.

However, in the data centers, media converters are not used very much. Therefore, they are not well versed in the specifications of the user interfaces of the media converters. In this case, the administrators of the data centers have to learn the specifications of the user interfaces of the media converters.

In such a scene, it is desirable if there is a control system enabling the administrators to control the media converters via the network switches by using the user interfaces of the network switches that the administrators are accustomed to using.

SUMMARY OF THE INVENTION

The present invention is a transmission device control system. This control system includes: a computer used for controlling; a network switch having a control port and a controller; a transmission device having a controller; a first transmission medium connecting the computer and the port of the network switch; and a second transmission medium used for transmitting a control signal transmitted/received between the controller that the network switch has and the controller that the transmission device has, wherein the computer transmits a predetermined command to the network switch by using a user interface for controlling the network switch, and the controller that the network switch has transmits the control signal to the controller that the transmission device has, based on the command transmitted from the computer.

Further scope of applicability of the present invention will become apparent from the detailed description given hereinafter. The detailed description and embodiments are only given as examples though showing preferred embodiments of the present invention, and therefore, from the contents of the following detailed description, changes and modifications of various kinds within the spirits and scope of the invention will become apparent to those skilled in the art.

BRIEF DESCRIPTION OF THE DRAWINGS

The present invention will be fully understood from the following detailed description and the accompanying drawings. The accompanying drawings only show examples and are not intended to restrict the present invention. In the accompanying drawings:

FIG. 6 is a diagram used to explain the electrical connection between a controller of the network switch and controllers of the media converter;

FIG. 7 is a view showing an example of the contents displayed on a monitor of the control computer in FIG. 2 when the control is performed via a user interface;

DETAILED DESCRIPTION

Hereinafter, embodiments of the present invention will be described with reference to the drawings.

[First Embodiment]

Figure 1:
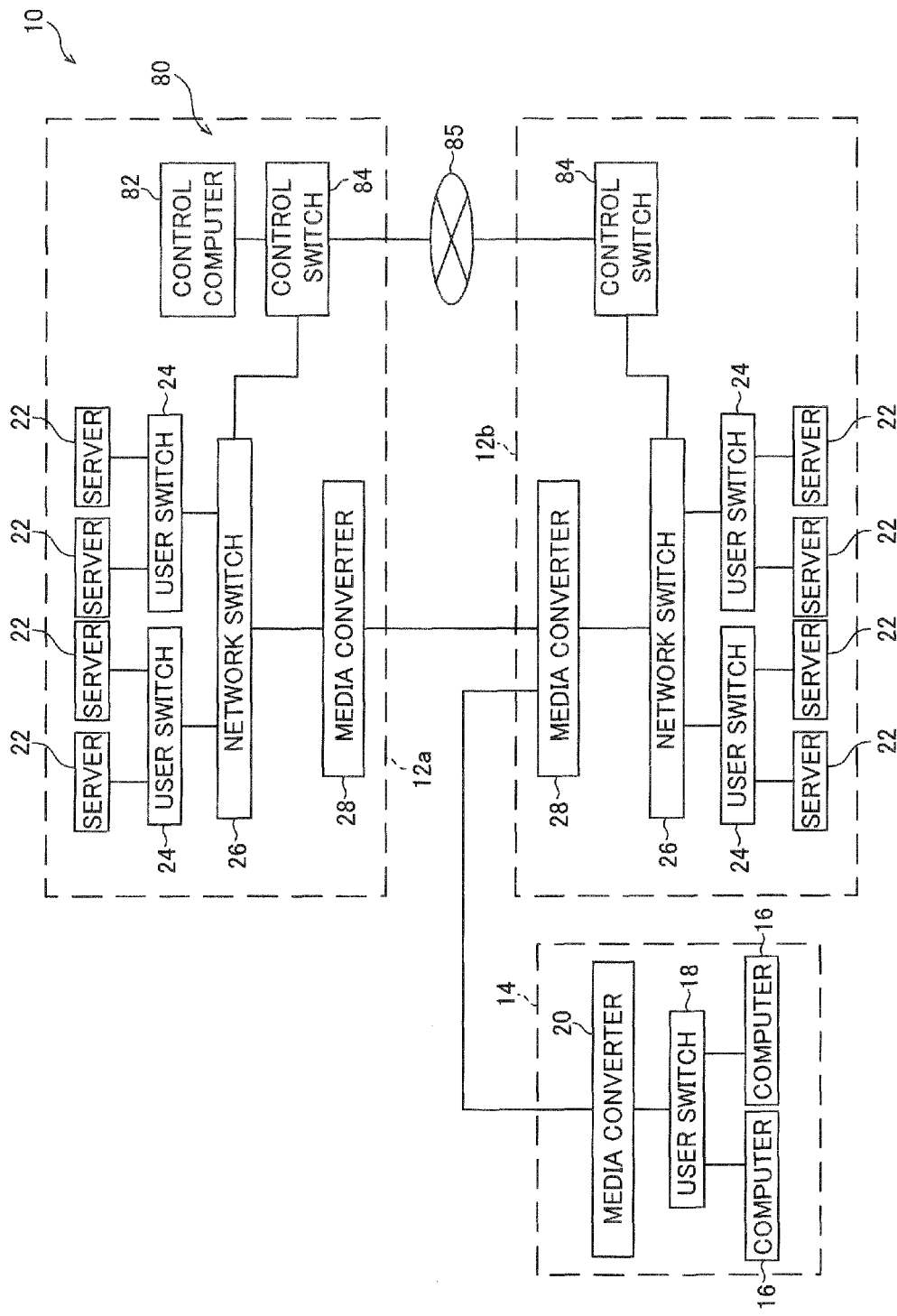
FIG. 1 is a block diagram showing a schematic structure of a network system including a control system of a first embodiment.

FIG. 1 is a diagram schematically showing a structure of a network system 10 of a first embodiment.

The network system 10 includes data center networks (DC networks) provided in data centers and a LAN (Local Area Network) provided in a user site. In this embodiment, the network system 10 includes a first DC network 12a provided in a first data center, a second DC network 12b provided in a second data center, and a LAN 14 provided in one user site.

The LAN 14 includes a plurality of computers 16 being, for example, PCs (personal computers). The computers 16 are connected to a user switch 18 via transmission mediums. The user switch 18 is connected to a media converter 20 via a transmission medium.

The second DC network 12b includes a plurality of servers 22. The servers 22 are connected to user switches 24 via transmission mediums. The user switches 24 are connected to a network switch 26 via transmission mediums. The network switch 26 is connected to a media converter 28 via a transmission medium. The user switches 24 and the network switch 26 are, for example, network switches such as L2 (Layer2) switches or L3 (Layer3) switches.

The first DC network 12a includes a plurality of servers 22. The servers 22 are connected to user switches 24 via transmission mediums. The user switches 24 are connected to a network switch 26 via transmission mediums. The network switch 26 is connected to a media converter 28 via a transmission medium.

The media converter 28 of the first DC network 12a and the media converter 28 of the second DC network 12b are connected to each other via a transmission medium. Further, the media converter 28 of the second DC network 12b and the media converter 20 of the LAN 14 are connected to each other via a transmission medium.

Therefore, the computers 16 in the user site are connected to the servers 22. An administrator at the user site is capable of making the servers 22 to execute various kinds of processing by operating the computers 16.

Note that the structures of the first DC network 12a and the second DC network 12b are preferable examples. For example, the numbers of the servers 22, the user switches 24, the network switches 26, and the media converters 28 are not particularly limited. Further, the numbers of the computers 16, the user switches 18, and the media converters 20 in the LAN 14 are not particularly limited.

[User Storage Switch]

Figure 2:
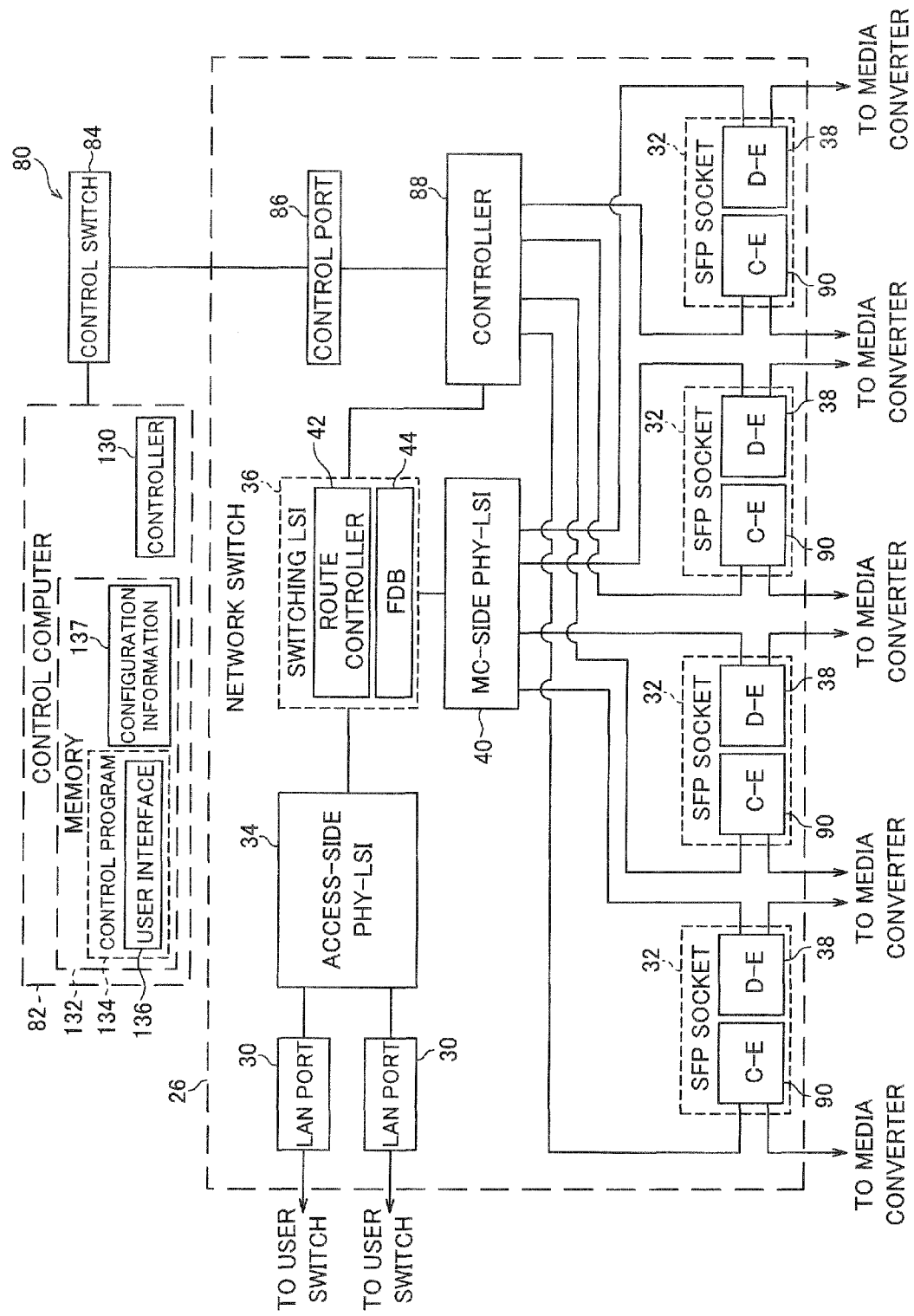
FIG. 2 is a block diagram schematically showing structures of a network switch and a control computer in FIG. 1.

FIG. 2 is a block diagram showing a schematic structure of the network switch. As shown in FIG. 2, the network switch 26 has a plurality of ports transmitting/receiving signals. As one kind of the ports, a plurality of LAN ports 30 used for the connection with the user switches 24 are provided, for instance.

The network switch 26 further has, as one kind of the ports, a plurality of sockets for optical transceivers used for the connection with the media converter 28. There are various kinds of standards for the optical transceivers. In this embodiment, the network switch 26 has SFP (Small Form-factor Pluggable) sockets 32.

The LAN ports 30 are connected to the external user switches 24 via transmission mediums. The LAN ports 30 are connected to an internal access-side PHY (Physical Layer)-LSI (Large Scale Integration) 34. The access-side PHY-LSI 34 is connected to a switching LSI 36. In an OSI (Open Systems Interconnection) reference model, the access-side PHY-LSI 34 is a large-scale integrated circuit in charge of a function of a PHY (physical) layer.

Therefore, the access-side PHY-LSI 34 decodes transmission codes being electrical signals received from the LAN ports 30 to convert them to transmission data (frames) and transmits the transmission data to the switching LSI 36. Further, the access-side PHY-LSI 34 encodes transmission data received from the switching LSI 36 to convert them to transmission codes and transmits electrical signals corresponding to the transmission codes to the LAN ports 30.

The SFP sockets 32 each have a data electrode (D-E) 38. The data electrodes 38 are connected to the external media converter 28 via transmission mediums. The data electrodes 38 transmit/receive electrical signals to/from the transmission mediums. The data electrodes 38 are further connected to an internal media-converter-side PHY-LSI 40 (MC-SIDE PHY-LSI 40). The media-converter-side PHY-LSI 40 is connected to the switching LSI 36.

The media-converter-side PHY-LSI 40 is a large-scale integrated circuit in charge of a function of a PHY (physical) layer in the OSI reference model. Therefore, the media-converter-side PHY-LSI 40 decodes transmission codes being electrical signals received from the data electrodes 38 of the SFP sockets 32 to convert them to transmission data (frames) and transmits the transmission data to the switching LSI 36. Further, the media-converter-side PHY-LSI 40 encodes transmission data received from the switching LSI 36 to convert them to transmission codes and transmits electrical signals corresponding to the transmission codes to the data electrodes 38 of the SFP sockets 32.

The switching LSI 36 is a large-scale integrated circuit in charge of functions of a MAC (Media Access Control) layer and, when necessary, upper-order layers in the OSI reference model. As the switching LSI 36, a commercially available Ethernet switch LSI, network processor, or the like is used, for instance. Further, the switching LSI 36 may be an integrated circuit such as FPGA (Field Programmable Gate Array) or ASIC (Application Specific Integrated Circuit).

The switching LSI 36 has a route controller 42 and a FDB (Forwarding Database) 44. The FDB 44 learns information regarding a destination of a frame and stores it. Based on the destination information of a received frame, the route controller 42 decides a port to which the frame should be output, by referring to the FDB 44. The route controller 42 transmits the frame to the access-side PHY-LSI 34 or the media-converter-side PHY-LSI 40 according to the port for output.

[Media Converter]

The media converter 28 is a kind of a transmission device for signal transmission. The media converter 28 has a function of transmission media conversion. The transmission media conversion includes conversion between a metal wire and an optical fiber, conversion between an optical fiber and an optical fiber which are different in communication standard, conversion between a metal wire or an optical fiber and radio, and so on.

In this embodiment, the media converter 28 is, for example, of a rack type. The rack type is composed of a chassis (frame) and a plurality of modules fixed to the chassis. Incidentally, the media converter 28 may be of a box type. In the box type, each module constitutes one independent device.

Figure 3:
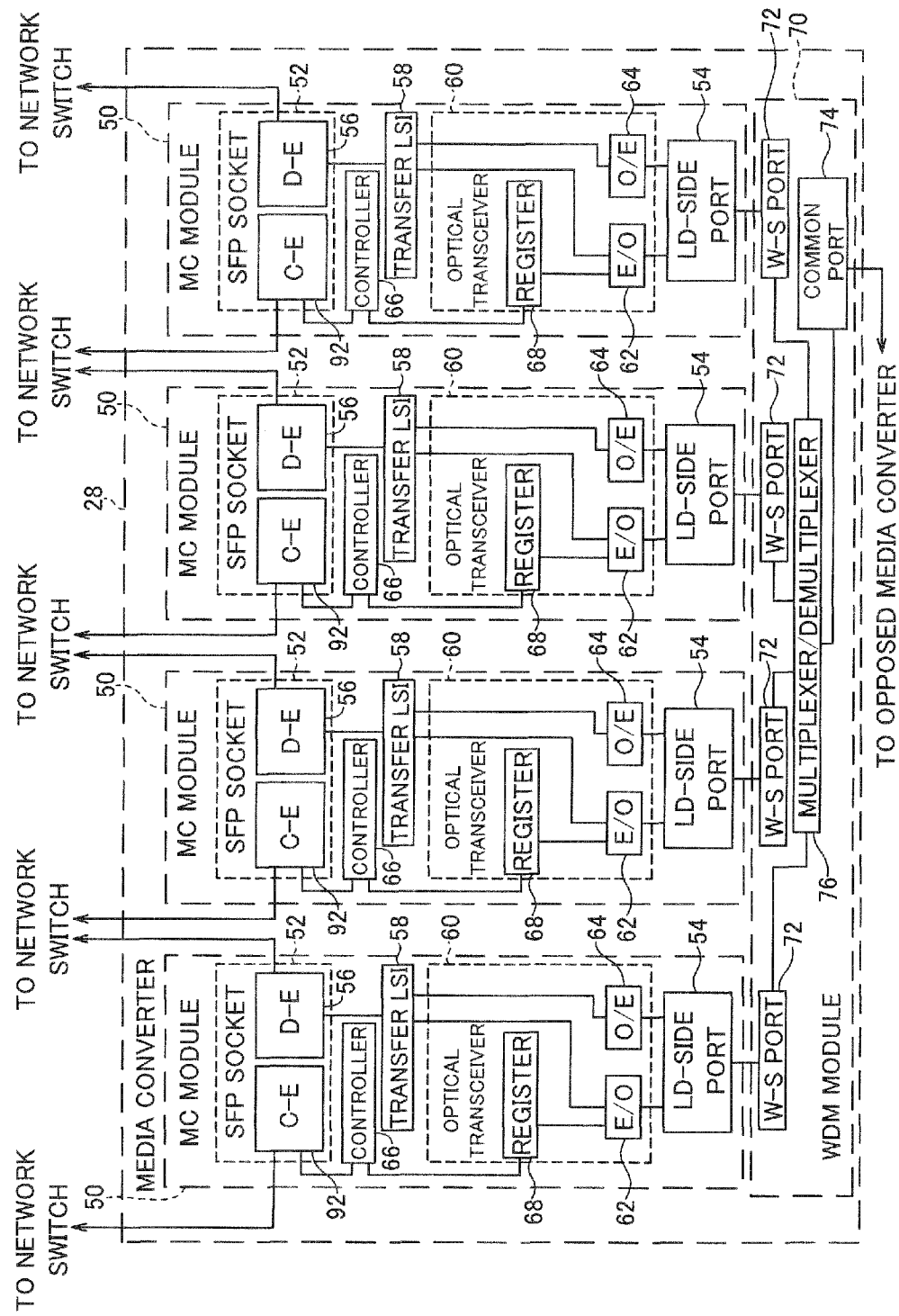
FIG. 3 is a block diagram schematically showing a structure of a media converter in FIG. 1.

FIG. 3 is a block diagram showing a schematic structure of the media converter 28. As shown in FIG. 3, the media converter 28 includes, for example, four MC (Media Converter) modules 50 as the modules. The MC modules 50 each have a SFP socket 52 and a long-distance-side port (LD-side port) 54 as ports for signal transmission/reception.

The SFP sockets 52 each have a data electrode 56. The data electrodes 56 are connected to the data electrodes 38 of the network switch 26 via transmission mediums. Further, the data electrodes 56 of the SFP sockets 52 are connected to internal transfer LSIs 58.

The long-distance-side ports 54 are connected to long-distance-side optical transceivers 60. The long-distance-side optical transceivers 60 are connected to the transfer LSIs 58.

The transfer LSIs 58 are large-scale integrated circuits such as FPGA or ASIC, for instance. The transfer LSIs 58 each appropriately process a transmission code as an electrical signal received from the data electrode 56 and thereafter transmit it to the long-distance-side optical transceiver 60. Further, the transfer LSIs 58 each appropriately process a transmission code as an electrical signal received from the long-distance-side optical transceiver 60 and thereafter transmit it to the data electrode 56. The appropriate processing is, for example, amplification, clock recovery, and so on.

The long-distance-side optical transceivers 60 each have, for example, an electrical-optical converter (E/O) 62 being a variable wavelength laser and an optical-electrical converter (O/E) 64 being a light-receiving element. The electrical-optical converter 62 and the optical-electrical converter 64 are optically connected to the long-distance-side port 54. The electrical-optical converter 62 converts a transmission code being an electrical signal received from the transfer LSI 58 to an optical signal and transmits it to the long-distance-side port 54. The optical-electrical converter 64 converts a transmission code as an optical signal received from the long-distance-side port 54 to an electrical signal and transmits it to the transfer LSI 58.

The MC modules 50 each further have a controller 66. The controllers 66 are integrated circuits such as CPU (Central Processing Unit), for instance. The long-distance-side optical transceivers 60 each include a register 68. Various parameters are readably written to the registers 68. The controller 66 controls the long-distance-side optical transceiver 60 by writing parameters to the register 68. Further, the controller 66 monitors a state of the long-distance-side optical transceiver 60 by reading the parameters in the register 68.

For example, a wavelength set value is written as one of the parameters in the register 68. The long-distance-side optical transceiver 60 causes the variable wavelength laser as the electrical-optical converter 62 to emit light with a wavelength corresponding to the wavelength set value.

[WDM Module]

In this embodiment, the media converter 28 has a WDM (Wavelength-Division Multiplexing) module 70. The WDM module 70 has a plurality of wavelength-specific ports (W-S port) 72, at least one common port 74, and a multiplexer/demultiplexer (device multiplexing or demultiplexing optical signals) provided between the wavelength-specific ports 72 and the common port 74.

The wavelength-specific ports 72 are connected to the long-distance-side ports 54 of the MC modules 50 via optical fibers being transmission mediums. The common port 74 is connected to the other opposed media converter 28 via an optical fiber being a transmission medium. The multiplexer/demultiplexer 76 joins a plurality of optical signals different in wavelength received from the long-distance-side ports 54 to multiplex them and transmits the resultant to the common port 74. Further, the multiplexer/demultiplexer 76 demultiplexes a multiplexed optical signal received from the common port 74 to split it and transmits the resultants to the wavelength-specific ports 72 corresponding to respectively wavelengths.

[Transmission Device Control System]

In this embodiment, the network system 10 is provided with a transmission device control system (hereinafter, "control system") 80 for controlling the network switches 26 and the media converters 28.

Referring to FIG. 1 again, the control system 80 is installed in the first DC network 12a of the first data center. The control system 80 includes a control computer 82 being PC and a control switch 84. The control switch 84 is, for example, an L2 switch or the like. The control computer 82 is connected to one of the network switches 26 via a network (control network) including the control switch 84.

That is, the control switch 84 forms a transmission medium connecting the control computer 82 and the network switch 26 (first transmission medium). Incidentally, the first transmission medium may be one communication cable directly connecting the control computer 82 and the network switch 26.

Further, the control computer 82 may be connected to the media converter 28 via the control switch 84. Further, the control computer 82 may be connected to the network switch 26 and the media converter 28 in the second data center via the control switch 84, an external network 85, and a control switch 84 installed in the second DC network 12b of the second data center.

As shown in FIG. 2, the network switch 26 is provided with a control port (port used for controlling) 86 and a controller 88. The control port 86 is connected to the control switch 84 via a transmission medium. The control port 86 is connected to the controller 88 via a transmission medium. The controller 88 is connected to the switching LSI 36 via a transmission medium. The controller 88 is, for example, an integrated circuit such as CPU (Central Processing Unit). An administrator of the network switch 26 is capable of controlling the network switch 26 by operating the control computer 82.

Further, the SFP sockets 32 of the network switch 26 are each provided with a control electrode (C-E) 90. The controller 88 is connected to the control electrodes 90. As shown in FIG. 3, the SFP sockets 52 of the media converter 28 are each also provided with a control electrode 92. The control electrodes 90 and the control electrodes 92 are connected via transmission mediums. The control electrodes 92 are connected to the controllers 66 of the MC modules 50.

Figure 4:
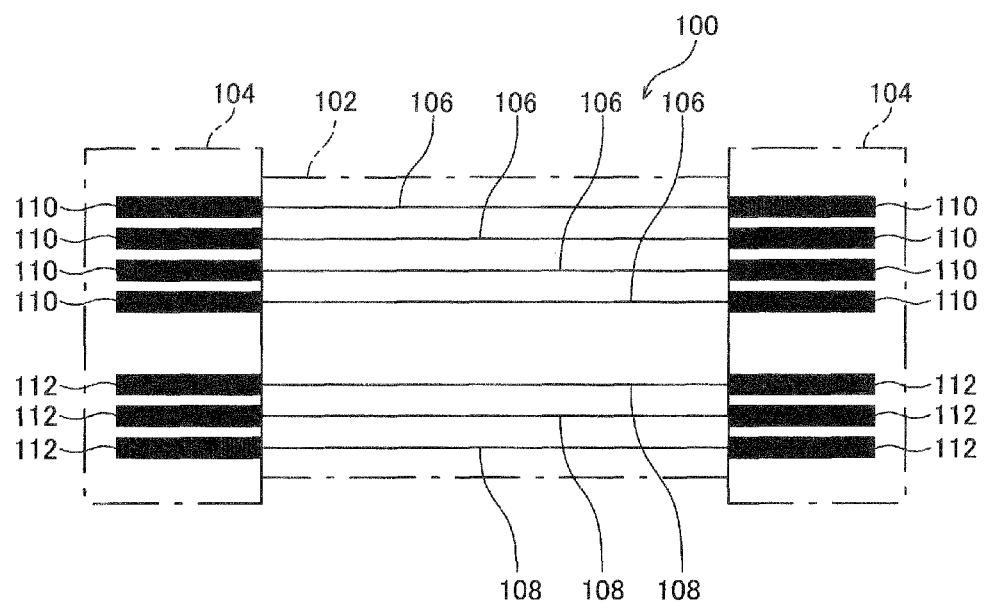
FIG. 4 is a view schematically showing a structure of a communication cable used for connecting the network switch in FIG. 2 and the media converter in FIG. 3.

Here, FIG. 4 shows a schematic structure of a communication cable 100 used for connecting the SFP sockets 32 of the network switch 26 and the SFP sockets 52 of the media converter 28.

The communication cable 100 has a cable main body 102 and plugs 104 provided at both ends of the cable main body 102. The cable main body 102 includes a plurality of data lines 106 and control lines 108.

In the plugs 104, data terminals 110 and control terminals 112 are provided in correspondence to the data lines 106 and the control lines 108. That is, the data terminals 110 are connected to both ends of the data lines 106. Further, the control terminals 112 are connected to both ends of the control lines 108.

The arrangement of the data terminals 110 and the control terminals 112 corresponds to the arrangement of the data electrodes 38, 56 and the control electrodes 90, 92. The communication cable 100 electrically connects the data electrodes 38 of the SFP sockets 32 of the network switch 26 and the data electrodes 56 of the SFP sockets 52 of the media converter 28. Further, the communication cable 100 electrically connects the control electrodes 90 of the SFP sockets 32 of the network switch 26 and the control electrodes 92 of the SFP sockets 52 of the media converter 28.

In the control system 80, the control lines 108 form a transmission medium (second transmission medium) connecting the network switch 26 and the media converter 28.

Figure 5:
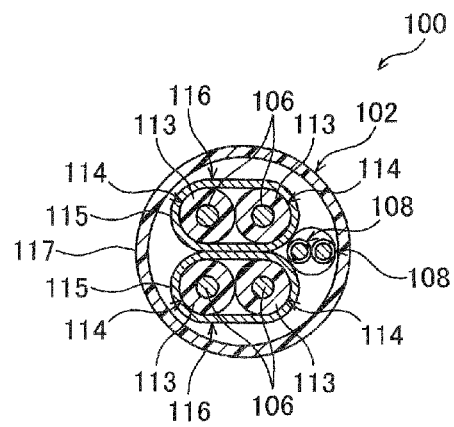
FIG. 5 is a view schematically showing a horizontal cross section of the communication cable in FIG. 4.

FIG. 5 is a view schematically showing a horizontal cross section of the cable main body 102 of the communication cable 100. As shown in FIG. 5, for example, conducting wires (internal conductors) being the data lines 106 are each covered by an insulator 113. The data line 106 and the insulator 113 form one coated conducting wire 114. The two coated conducting wires 114 in a twisted state are collectively covered by a shield (external conductor) 115. The coated conducting wire 114, 114 and the external conductor 115 form one twisted pair cable 116. That is, the twisted pair cable 116 is a twisted pair cable with two cores.

The control lines 108 are coated conducting wires, and the control lines 108 are twisted to form a twisted pair cable. The twisted pair cables 116, 116 and the control lines 108, 108 are collectively covered by a shield 117.

Note that the number of the control lines 108 is two in FIG. 5. The external conductors 115 of the twisted pair cables 116 also serve as grounding lines of the control lines 108.

[Communication Method of Control System]

The control system 80 also controls the media converter 28 via the network switch 26. The control performed by the control system 80 includes the confirmation of various states of the network switch 26 and the media converter 28 and the setting of various parameters of the network switch 26 and the media converter 28. Therefore, control signals are transmitted/received between the network switch 26 and the media converter 28.

In the control system 80, as a communication method between the network switch 26 and the media converter 28, serial communication is adopted. Preferably, I2C (Inter Integrated Circuit) or MDIO (Management Data Input/Output) is adopted.

FIG. 6 is a block diagram schematically showing electrical wiring between the controller 88 of the network switch 26 and the controllers 66 of the MC modules 50 when I2C is adopted as the communication method. As shown in FIG. 6, when I2C is adopted, the controller 88 and the controllers 66 are both connected to a serial data (SDA) line 120 and a serial clock (SCL) line 122. The serial data line 120 and the serial clock line 122 each include the control lines 108 in part thereof.

In I2C, as a master (main unit), the controller 88 issues commands. As slaves (subordinate units), the controllers 66 of the MC modules 50 receive the commands. The controllers 66 perform reading and writing from/to the registers 68 of the long-distance-side optical transceivers 60 according to the commands from the controller 88. The variable wavelength lasers of the electrical-optical converters 62 change the wavelengths according to the wavelength set values in the registers 68. For this purpose, the controller 88 issues, to the controllers 66, commands to write the wavelength set values to the registers 68. Consequently, the variable wavelength lasers of the electrical-optical converters 62 emit light with desired wavelengths.

That is, the controllers 66 cooperate with the controller 88 of the network switch 26 to form a controller performing control in the MC modules 50 of the media converter 28.

[Control Computer and User Interface]

Here, referring to FIG. 2 again, the control computer 82 has a controller 130 being an integrated circuit such as, for example, CPU and a memory 132. In the memory 132, a control program 134 is installed as application software for operating the controller 88. The control program 134 stipulates a user interface 136 as an input/output method in the control computer 82. In this embodiment, CLI (Command Line Interface) for controlling the network switch 26 is adopted as the user interface 136.

An administrator is capable of using the CLI of the control program 134 by causing the controller 130 to execute the control program 134. According to the CLI, the administrator is capable of inputting a command to the control program 134 and sending the command to the controller 88 of the network switch 26 by operating a keyboard of the control computer 82. Further, by seeing characters displayed on a monitor of the control computer 82, the administrator is capable of confirming the contents of a command input to the control program 134 and confirming the results and so on of processes performed based on the command.

In this embodiment, the administrator is capable of controlling the media converter 28 by inputting a command to the control program 134 and sending the command to the controller 88 of the network switch 26. That is, the control computer 82 is capable of controlling the media converter 28 via the network switch 26 by using the CLI of the network switch 26.

FIG. 7 is a view showing an example of the contents displayed on the monitor of the control computer 82 when a command is input by using the control program 134. The first paragraph in FIG. 7 displays the contents regarding the setting of the ports of the network switch 26. Concretely, it displays the contents to the effect that the four SFP sockets 32 assigned the port numbers 1/25, 1/27, 1/29, 1/31 are bundled to be virtually handled as one port.

The second paragraph in FIG. 7 displays the contents regarding the setting of the media converter 28. "ABCDEFG" on line 2 represents the identification number of the media converter 28. "HIJKLMN" on line 4 represents a type of the WDM module 70. On line 5 to line 8 in the second paragraph, it is stipulated that the four SFP sockets 32 of the network switch 26 are connected to the SFP sockets 52 of the MC modules 50 assigned the port numbers 1, 2, 3, 4.

The third paragraph in FIG. 7 displays a table of control information of the network switch 26 and the media converter 28.

The display in the third paragraph shows the following.

The wavelength-specific ports 72 of the WDM module 70 are each composed of a transmission port TX and a reception port RX. In the type "HIJKLMN", grids 59, 57, 51, 46 are adopted as the transmission ports TX. Further, grids 36, 32, 29, 20 are adopted as the reception ports RX.

The long-distance-side ports 54 of the MC modules 50 are assigned the port numbers 1, 2, 3, 4. The long-distance-side ports 54 are each composed of a transmission port TX and a reception port RX. The transmission ports TX of the long distance-side ports 54 assigned the port numbers 1, 2, 3, 4 are connected to the transmission ports TX assigned the grids 59, 57, 51, 46 of the WDM module 70 respectively via optical fibers. The reception ports RX of the long-distance-side ports 54 assigned the port numbers 1, 2, 3, 4 are connected to the transmission ports TX assigned the grids 36, 32, 29, 20 of the WDM module 70 respectively via optical fibers.

Note that one wavelength is allotted to each of the grid numbers. The grid number represents a wavelength of an optical signal that is to be transmitted/received at the transmission port TX and the reception port RX of the WDM module 70, and is defined based on the specifications of the multiplexer/demultiplexer 76. The multiplexer/demultiplexer 76 sets the wavelengths of the optical signals based on the control signals (configuration information) that the controllers 66 receive from the controller 88.

Therefore, the wavelengths of lights that are to be emitted by the electrical-optical converters 62 of the MC modules 50 are defined by the grid numbers of the transmission ports TX in the WDM module 70.

Regarding a connection state of the long-distance-side ports (long hole: LH) 54 of the media converter 28, only the port number 1 is disconnected, and the connection is ensured for the port numbers 2, 3, 4. Further, regarding a connection state of the SFP sockets (User) 52 of the media converter, the connection is ensured for all of the port numbers 1, 2, 3, 4.

According to the table of the control information in the third paragraph, the four SFP sockets 32 of the network switch 26 assigned the port numbers 1/25, 1/27, 1/29, 1/31 are connected to the SFP sockets 52 of the MC modules 50 assigned the port numbers 1, 2, 3, 4 respectively, as stipulated in the second paragraph. Regarding a connection state of the four SFP sockets 32 of the network switch 26, the connection is ensured for all of the port numbers 1/25, 1/27, 1/29, 1/31.

[Configuration Information and Automatic Setting Function]

In this embodiment, the control program 134 has a function of storing configuration information 137 in advance. The control program 134 further has a function of automatically setting various parameters of the media converter 28 by referring to the configuration information 137.

The configuration information 137 is concretely information on the wavelengths allotted to the grid numbers assigned to the transmission ports TX of the WDM module 70 according to the type of the WDM module 70. When the type of the WDM module 70 and the port number of the long-distance-side port 54 of the MC module 50 connected to the transmission port TX of the WDM module 70 are input to the control program 134, the electrical-optical converter 62 of the MC module 50 automatically instructs the long-distance-side optical transceiver 60 to emit light with the predetermined wavelength allotted to the grid number. Then, according to this command, the electrical-optical converter 62 of the MC module 50 emits light with the designated wavelength.

In the control system 80 applied to the network system 10 of the first embodiment, the administrator inputs commands based on the CLI of the network switch 26 and transmits the commands (commands based on the control information and the configuration information) to the network switch 26. Upon receiving the commands from the control computer 82, the controller 88 of the network switch 26 transmits control signals (signals based on the commands from the control computer 82) to the controllers 66 of the media converter 28. When necessary, the controller 88 receives control signals from the controllers 66 and outputs the contents of the received control signals to the control computer 82.

According to this configuration, the administrator is capable of controlling the media converter 28 via the network switch 26 by using the user interface 136 for controlling the network switch 26.

Further, in the network system 10 of the first embodiment, the control system 80 holds the configuration information 137 of the media converter 28. The control system 80 automatically controls the media converter 28 by referring to the configuration information 137. Therefore, the administrator need not know the configuration information 137. Concretely, the administrator need not know the information such as the wavelengths allotted to the transmission ports TX of the WDM module 70. The administrator is capable of easily controlling the media converter 28 only by inputting the type of the WDM module 70 and the port number of the long-distance-side port 54 of the MC module 50 connected to the transmission port TX of the WDM module 70.

Further, in the network system 10 of the first embodiment, the control system 80 uses the communication cable 100 for connecting the network switch 26 and the media converter 28. The communication cable 100 includes the data lines 106 for frame transfer and the control lines 108 for controlling separately. The control lines 108 connect the control electrodes 90 of the network switch 26 and the control electrodes 92 of the media converter 28. Therefore, the control signal conforming to the standard of I2C or MDIO is transmitted to the media converter 28 via the network switch 26.

The communication cable 100 further includes the data lines 106 for frame transfer and the control lines 108 for controlling separately. Therefore, SFP sockets generally used in the network switch 26 and the media converter 28 can be used as they are. Therefore, it is possible to easily realize the control system 80 without making any complicated design changes in the network switch 26 and the media converter 28.

[Second Embodiment]

Hereinafter, as a second embodiment, a control system 200 applied to a network system 10 will be described. Note that in the following description of the embodiment, structures the same as or similar to those in the above-described embodiment will be denoted by the same names and reference signs and a description thereof will be omitted or simplified.

Figure 8:
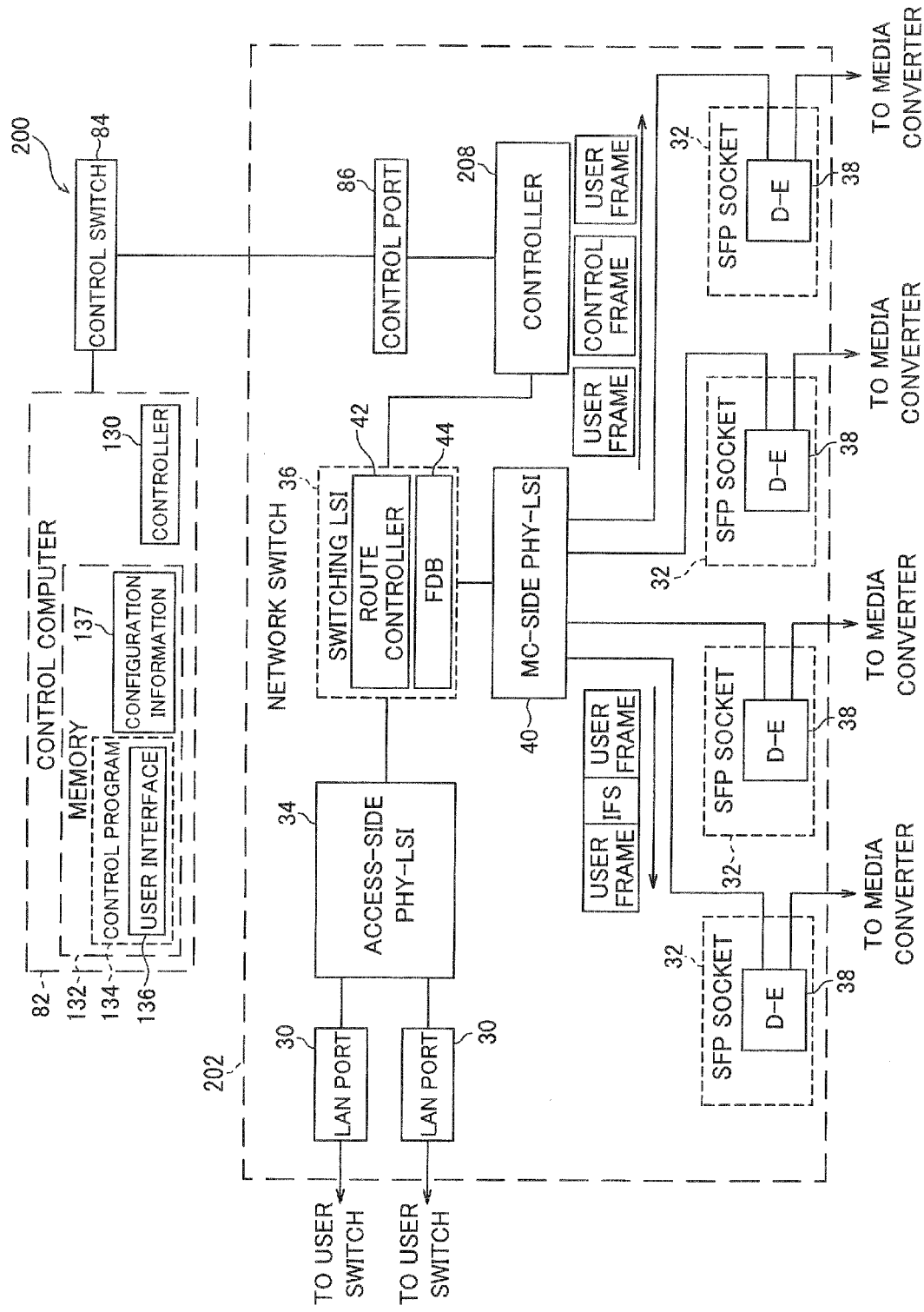
FIG. 8 is a block diagram schematically showing structures of a network switch and a control computer according to a second embodiment.
Figure 9:
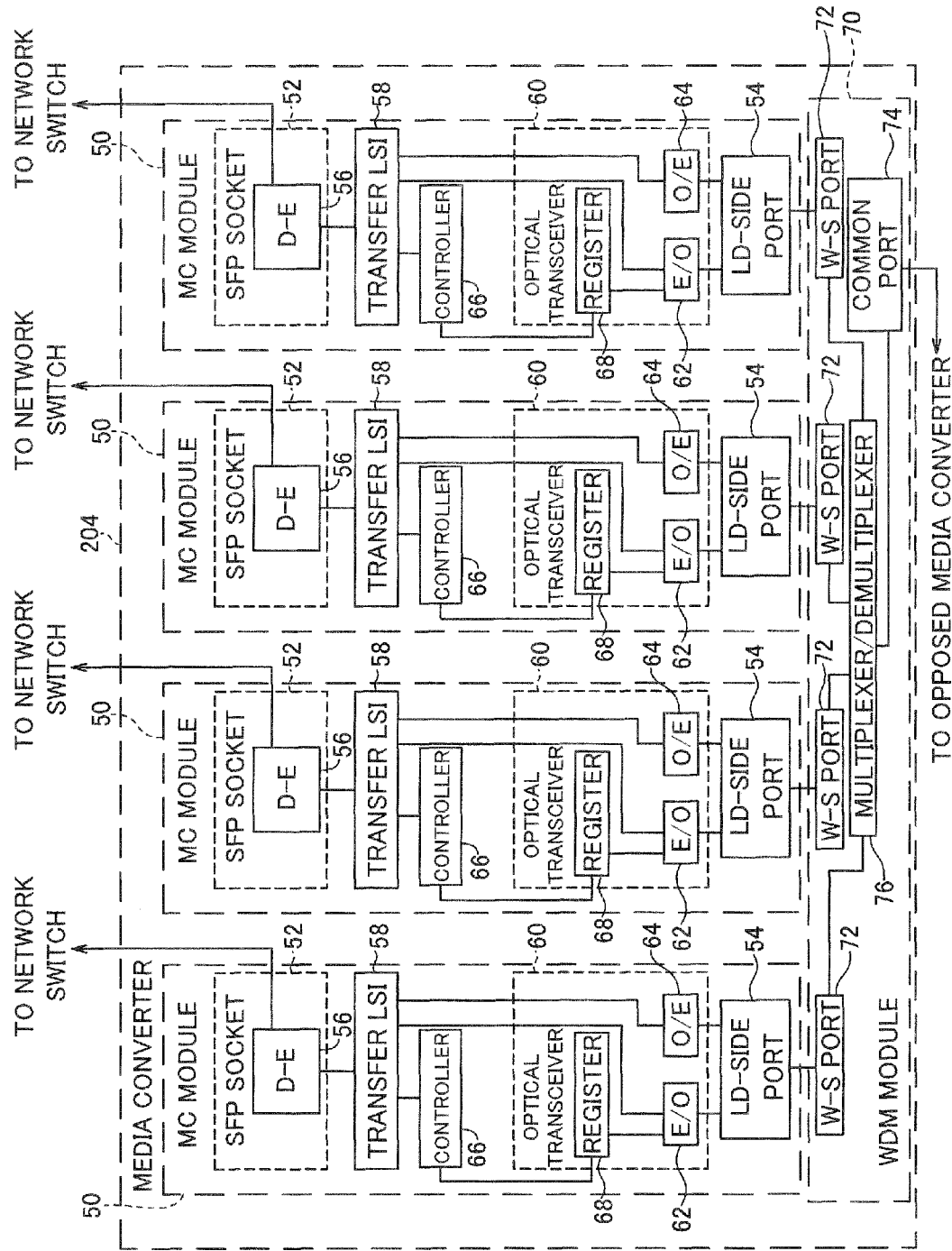
FIG. 9 is a block diagram schematically showing a structure of a media converter according to the second embodiment.
Figure 10:
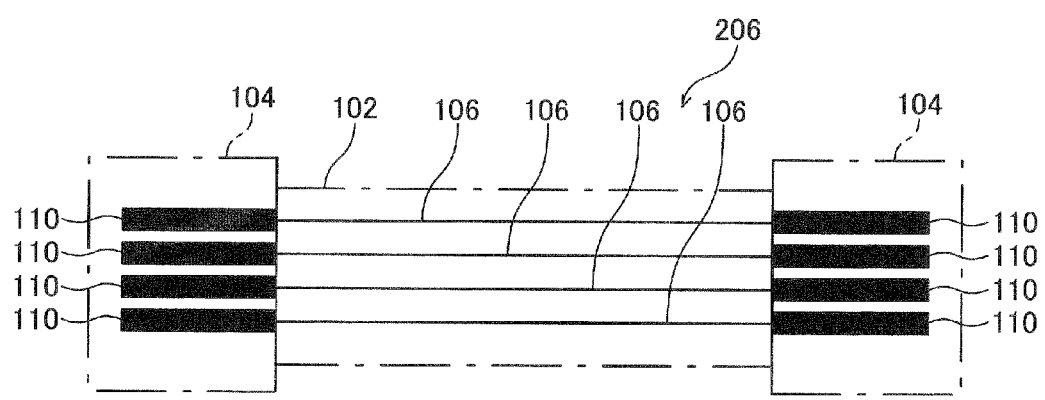
FIG. 10 is a view schematically showing a structure of a communication cable used for connecting the network switch in FIG. 8 and the media converter in FIG. 9.

FIG. 8 is a block diagram schematically showing a structure of a network switch 202 to which a control computer 82 is connected via a control switch 84. FIG. 9 is a block diagram schematically showing a structure of a media converter 204 controlled via the network switch 202. FIG. 10 is a view showing a schematic structure of a communication cable 206 used for connecting SFP sockets 32 of the network switch 202 and SFP sockets 52 of the media converter 204. Incidentally, an optical fiber connecting two SFP and SFP as optical transceivers may be used instead of the communication cable 206.

As shown in FIG. 10, the communication cable 206 does not have any control line 108. The communication for controlling between the network switch 202 and the media converter 204 is performed through data lines 106. That is, the data lines 106 not only function as transmission mediums (second transmission mediums) for transmitting control signals but also are used for normal frame (user frame) transmission.

Specifically, when a controller 208 of the network switch 202 generates the control signals, the control signals are transmitted to the media converter 204 through a switching LSI 36, a media-converter-side PHY-LSI 40, and the SFP sockets 32.

Then, transfer LSIs 58 of MC modules 50 of the media converter 204 extract the control signals to transmit them to controllers 66. The controllers 66 execute the control according to the control signals received from the transfer LSIs 58.

Further, when necessary, the controllers 66 of the MC modules 50 generate control signals and transmit them to the network switch 202 through the transfer LSIs 58. In this case, the switching LSI 36 of the network switch 202 extracts the control signals to transmit them to the controller 208.

[Format of Control Signal]

The control signal may be transmitted as an Ethernet frame (control frame) of the same kind as the user frame or an IP packet as shown in FIG. 8. Alternatively, the control signal may be transmitted while being inserted in a gap between user frames as IFS (inter-frame signal). Alternatively, the control signal may be transmitted as a low-frequency signal superimposed on the user frame.

As a format of the control frame, for example, the same format as that of CCM (Continuity Check Message) defined by Ethernet OAM (OAM is Operation, Administration and Maintenance) of IEEE802.1ag is adoptable.

In this case, the controller 208 is capable of storing control information in an optional TLV (Type Length Value) area in CCM. Concretely, in the optional TLV area, the controller 208 is capable of storing as the control information one kind or more selected from wavelengths of emitted light of electrical-optical converters 62, optical power (transmission power) of the light emitted by the electrical-optical converters 62, optical power (reception power) of light received by optical-electrical converters 64, a connection state, a bit error rate, and so on.

Further, as the format of the control frame, the same format as that of a link monitoring frame defined by the Ethernet standard for subscribers of IEEE802.3ah, for instance is adoptable.

As a format of the control signal, the same format as that of a SNMP (Simple Network Management Protocol) message defined by SNMP such as RFC (Request For Comments) 1155 may be adopted. In this case, as the control frame, the controller 208 generates an Ethernet frame containing a SNMP message in a payload area. The control frame is transmitted to the media converter 204.

When the format conforms to SNMP, the MC modules 50 of the media converter 204 each have MIB (Management Information Base). In MIB, the control information is stored. The controller 208 is capable of obtaining the control information of the MC modules 50 by means of a Get command. Further, the controller 208 is capable of setting the MC modules 50 by means of a Set command. Further, by means of a Trap command, the controller 208 is capable of receiving a notification of a change in the control information in the MC modules 50, that is, trouble occurrence.

Alternatively, as the format of the control signal, a format conforming to I2 or MDIO may be adopted. In this case, the controller 208 is capable of generating a control frame including the control signal in a payload area as in the case where the format conforms to SNMP. The control frame is transmitted to the media converter 204.

In the control system 200 applied to the network system 10 of the above-described second embodiment, the controller 208 of the network switch 202 transmits the control signals to the controllers 66 of the media converter 204 based on commands from the control computer 82. When necessary, the controller 208 receives control signals from the controllers 66 to output the contents of the received control signals to the control computer 82.

According to this structure, as in the first embodiment, an administrator is capable of controlling the media converter 204 via the network switch 202 by using a user interface 136 for controlling the network switch 202.

Further, in the network system 10 of the second embodiment, the control system 200 controls the media converter 204 based on the standard such as IEEE802.1ag, IEEE802.3ah, or SNMP. Therefore, by equipping the network switch 26 and the media converter 204 with the function of the above standard, it is possible to easily realize the control system 200.

Further, in the network system 10 of the second embodiment, since the transmission method of the control signals uses the data lines, the communication cable connecting the network switch 202 and the media converter 204 need not have the control lines, which enables the use of a generally used communication cable.

[Third Embodiment]

Hereinafter, as a third embodiment, a control system 300 applied to a network system 10 will be described.

Figure 11:
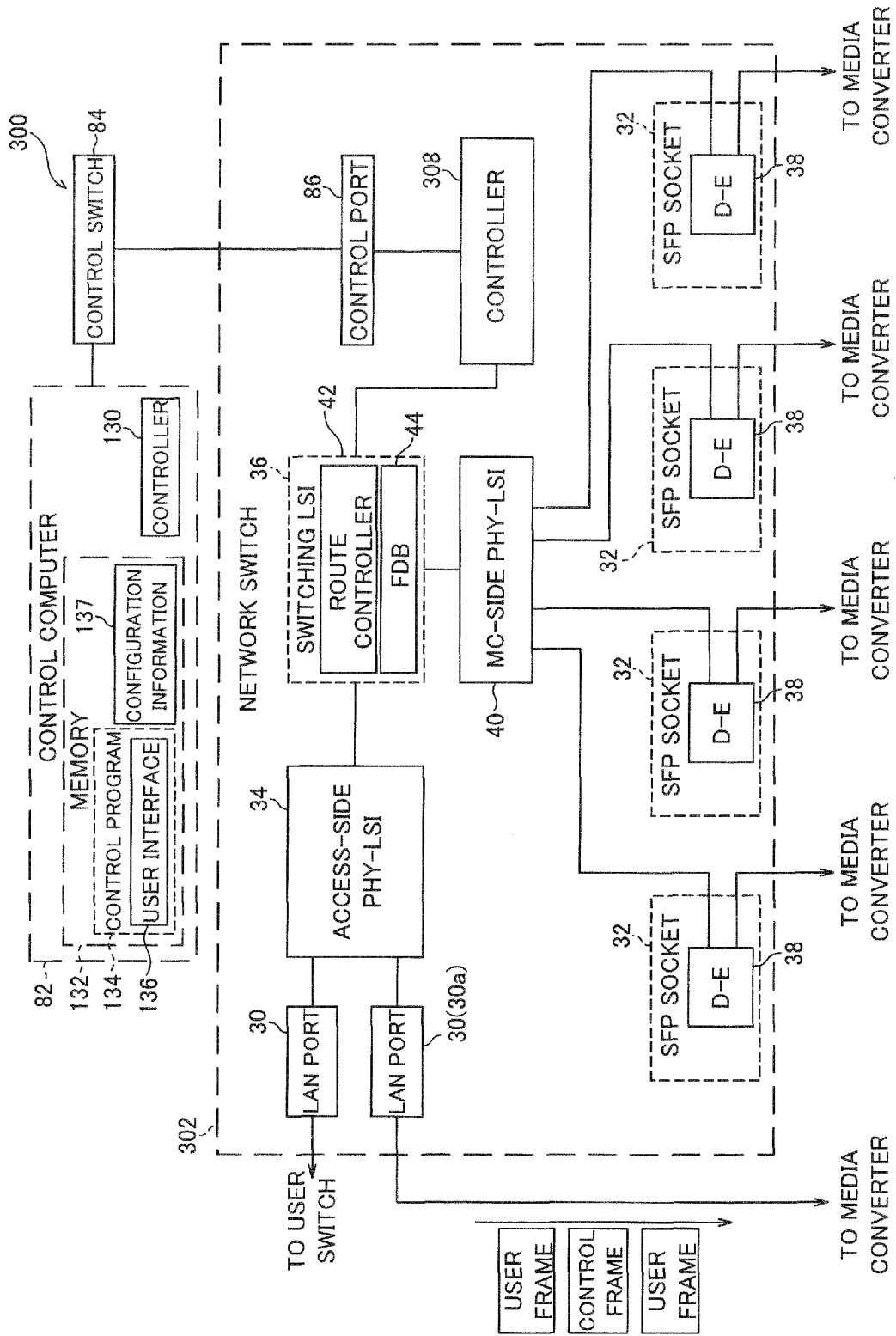
FIG. 11 is a block diagram schematically showing structures of a network switch and a control computer according to a third embodiment.
Figure 12:
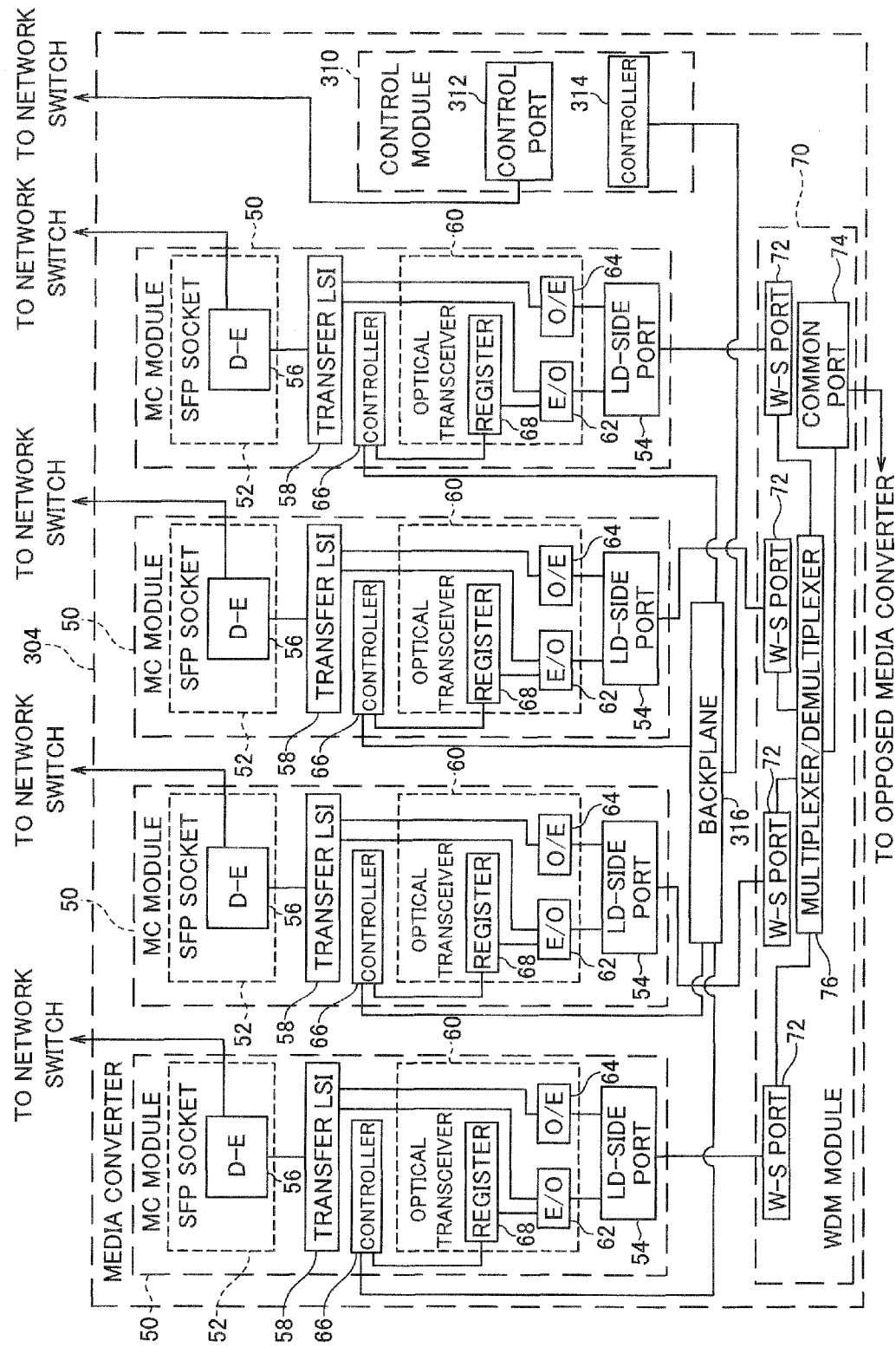
FIG. 12 is a block diagram schematically showing a structure of a media converter according to the third embodiment.

FIG. 11 is a block diagram schematically showing a structure of a network switch 302 to which a control computer 82 is connected via a control switch 84. FIG. 12 is a block diagram schematically showing a structure of a media converter 304 controlled via the network switch 302.

A controller 308 of the network switch 302 is different from the controller 208 of the second embodiment in that it transmits a control signal to one port selected from LAN ports 30 (hereinafter, referred to as a control LAN port 30a). For example, the control LAN port 30a is assigned VLAN_ID different from that of the other LAN port 30 so as to be discriminated from the other LAN port 30.

The media converter 304 has a control module 310 attached to a chassis. The control module 310 has a control port 312. The control port 312 is connected to the control LAN port 30a of the network switch 302 via a communication cable (second transmission medium) as a transmission medium for the control signal.

Further, the control module 310 has a controller 314 connected to the control port 312. The controller 314 is an integrated circuit such as, for example, CPU. The controller 314 is connected to a backplane (kind of a circuit board) 316 provided on the chassis. MC modules 50 are connected to the backplane 316.

Therefore, the controller 314 is connected to the MC modules 50 via the backplane 316. More concretely, the controller 314 is connected to controllers 66 of the MC modules 50. The controller 314 of the media converter 304 has a function of distributing commands received from the controller 308 of the network switch 302 to the controllers 66 of the MC modules 50.

In the control system 300 applied to the network system 10 of the above-described third embodiment, the controller 308 of the network switch 302 transmits the control signal to the controller 314 of the media converter 304 based on a command from the control computer 82. When necessary, the controller 308 receives a control signal from the controller 314 to output the contents of the received control signal to the control computer 82.

According to this structure, as in the first embodiment, an administrator is capable of controlling the media converter 304 via the network switch 302 by using a user interface 136 for controlling the network switch 302.

Further, in the network system 10 of the third embodiment, the controller 314 of the control module 310 of the media converter 304 is in charge of the control of the plural MC modules 50. Therefore, by connecting the LAN port 30a of the network switch 302 and the control port 86 of the control module 310 to transmit the control signal, it is possible to control the plural MC modules 50.

[Fourth Embodiment]

Hereinafter, as a fourth embodiment, a control system 400 applied to a network system 10 will be described.

Figure 13:
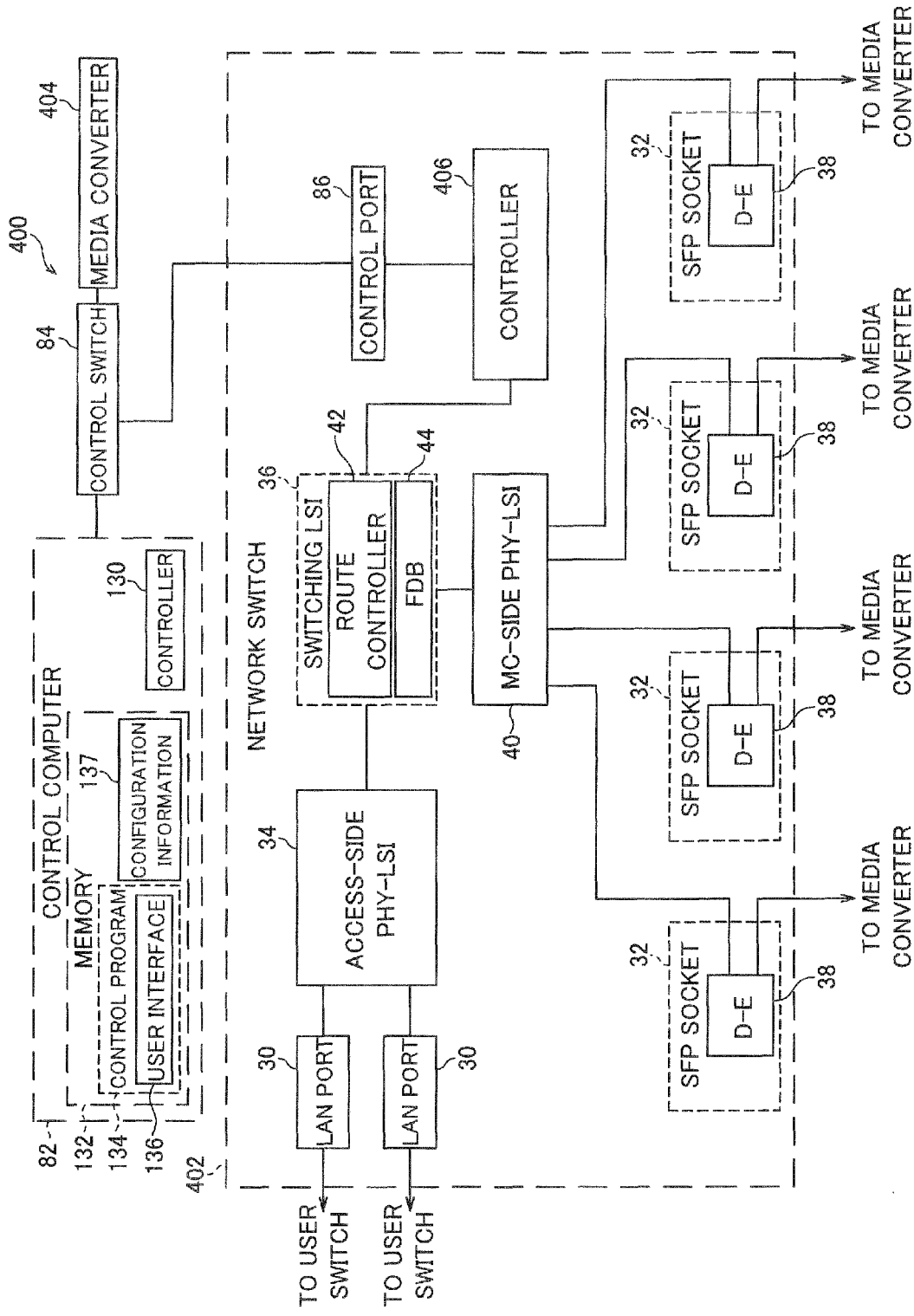
FIG. 13 is a block diagram schematically showing structures of a network switch and a control computer according to a fourth embodiment.
Figure 14:
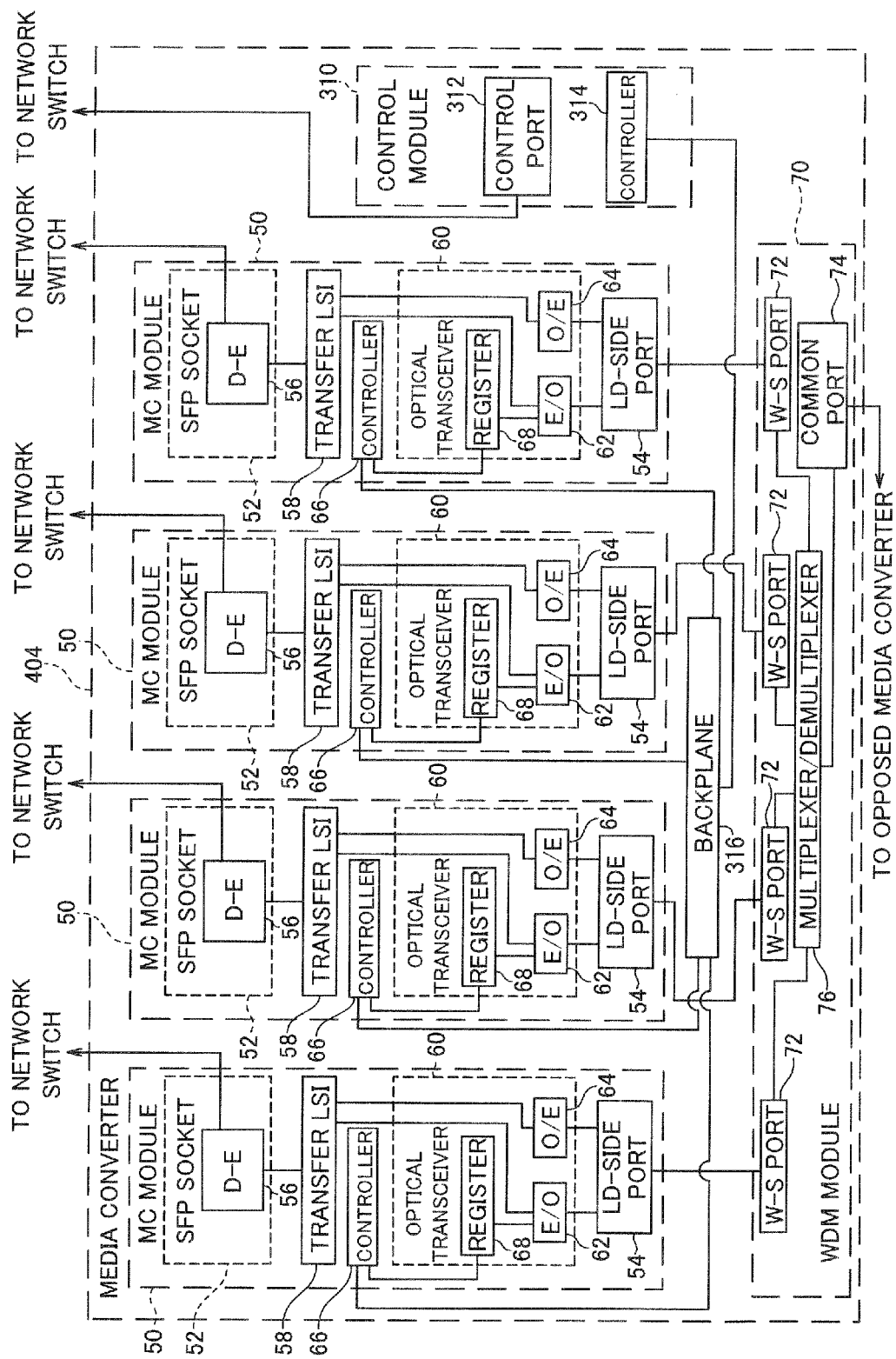
FIG. 14 is a block diagram schematically showing a structure of a media converter according to a fourth embodiment.

FIG. 13 is a block diagram schematically showing a structure of a network switch 402 to which a control computer 82 is connected via a control switch 84. FIG. 14 is a block diagram schematically showing a structure of a media converter 404 controlled via the network switch 402.

As shown in FIG. 13 and FIG. 14, a control port 86 of the network switch 402 is connected to a control port 312 of a control module 310 of the media converter 404 via the control switch 84. That is, a control network including the control switch 84 includes a transmission medium (second control transmission medium) for control signals.

Therefore, in the control system 400, the communication for controlling between the network switch 402 and the media converter 404 is performed through the control switch 84, that is, the control network.

Therefore, upon generating the control signals, a controller 406 of the network switch 402 transmits them to the media converter 404 through the control port 86. Upon receiving the control signals, the control module 310 of the media converter 404 distributes the control signals to controllers 66 of MC modules 50 as in the third embodiment.

Contrarily, when the control module 310 of the media converter 404 transmits a control signal through the control port 312, the controller 406 of the network switch 402 receives the control signal through the control port 86.

In the control system 400 applied to the network system 10 of the above-described fourth embodiment, the controller 406 of the network switch 402 transmits the control signal to the controller 314 of the media converter 404 based on a command from the control computer 82. When necessary, the controller 406 receives a control signal from the controller 314 and outputs the contents of the received control signal to the control computer 82.

According to this structure, as in the first embodiment, an administrator is capable of controlling the media converter 404 via the network switch 402 by using a user interface 136 for controlling the network switch 402.

Further, in the network system 10 of the fourth embodiment, since the control port 86 of the network switch 402 and the control port 312 of the media converter 404 are connected via the control switch 84, it is possible to easily realize the control system 400.

[Fifth Embodiment]

Hereinafter, a network system 500 of a fifth embodiment and a control system 600 applied to the network system 500 will be described.

Figure 15:
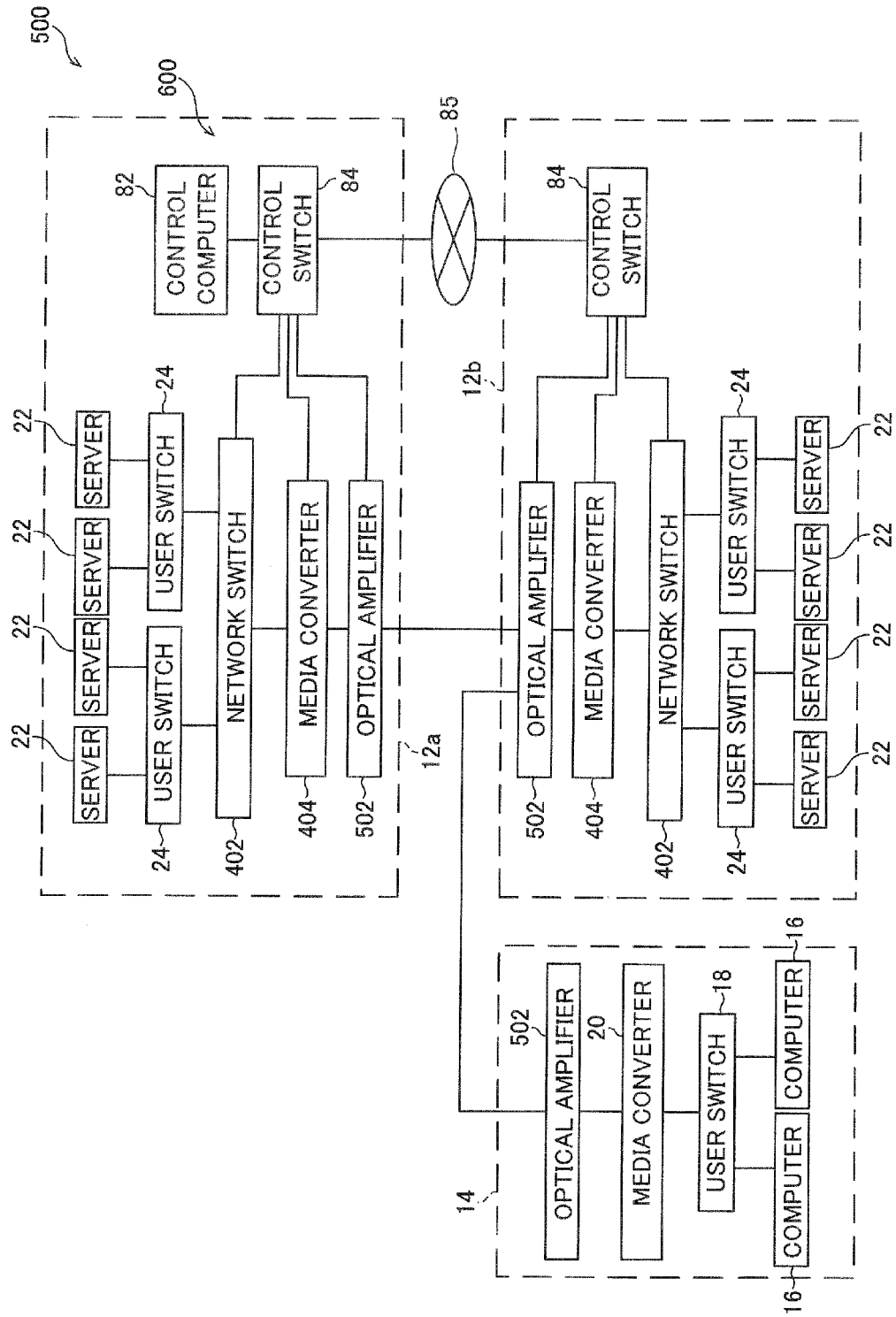
FIG. 15 is a block diagram showing a schematic structure of a network system including a control system of a fifth embodiment.

FIG. 15 is a block diagram showing a schematic structure of the network system 500. The network system 500 includes optical amplifiers 502.

The optical amplifiers 502 are disposed at entrances of a first DC network 12a, a second DC network 12b, and a LAN 14 respectively. The optical amplifiers 502 each have a function of amplifying an optical signal to deliver it to a media converter 404. Note that the optical amplifiers 502 only need to amplify the optical signals immediately before they enter the media converters 404 or immediately after they exit from the media converters 404 and only need to amplify optical signals in one direction. Therefore, optical signals that require no amplification are transmitted without going through the optical amplifiers 502.

Figure 16:
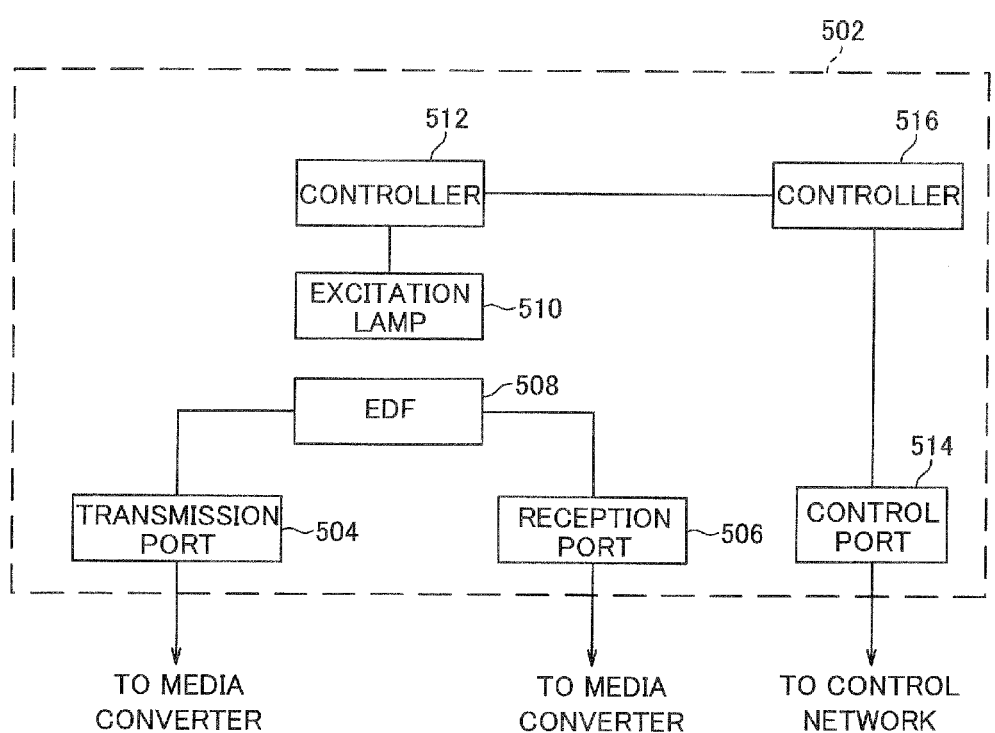
FIG. 16 is a block diagram showing a schematic structure of an optical amplifier in FIG. 15.

FIG. 16 is a block diagram showing a schematic structure of the optical amplifier 502. The optical amplifier 502 has a transmission port 504 and a reception port 506. Between the transmission port 504 and the reception port 506, an EDF (Erbium-Doped Fiber) 508 is provided. The EDF 508 is irradiated with light by an excitation lamp 510.

The EDF 508 is brought into an excitation state when irradiated with light by the excitation lamp 510, and an optical signal is amplified when passing through the excited EDF 508. Note that a light-emitting state of the excitation lamp 510 is controlled by a controller 512 being an integrated circuit such as, for example, CPU.

A control computer 82 of the control system 600 is connected to the optical amplifier 502 via a control switch 84. In the optical amplifier 502, a control port 514 being, for example, a RJ (Registered jack)-45 modular jack is provided. The control port 514 is connected to the control switch 84. Therefore, a controller 406 of a network switch 402 is connected to the control port 514 of the optical amplifier 502 via a control port 86 and the control switch 84.

The control port 514 is connected to a controller 516 provided in the optical amplifier 502. The controller 516 is an integrated circuit such as, for example, CPU. The controller 516 is connected to a controller 512. The controller 406 of the network switch 402 is capable of controlling the optical amplifier 502 via the control port 86, the control switch 84, and the control port 514 and the controller 516 of the optical amplifier 502. Incidentally, the controller 516 and the controller 512 may be one CPU.

In this embodiment, an administrator is capable of controlling the optical amplifier 502 by using a user interface 136 for controlling the network switch 402. Configuration information 137 contains configuration information of the optical amplifier 502. As a format of a control signal used for controlling the optical amplifier 502, the same format as that in the fourth embodiment is usable.

In the control system 600 applied to the network system 500 of the fifth embodiment, the controller 406 of the network switch 402 transmits a control signal to a controller 314 of the media converter 404 based on a command from the control computer 82. When necessary, the controller 406 receives a control signal from the controller 314 to output the contents of the received control signal to the control computer 82.

According to this structure, an administrator is capable of controlling both the media converter 404 and the optical amplifier 502 via the network switch 402 by using the user interface 136 for controlling the network switch 402.

Further, in the network system 500 of the fifth embodiment, the control system 600 holds the configuration information 137 of the optical amplifier 502, and automatically controls the optical amplifier 502 by referring to the configuration information 137. Therefore, the administrator is capable of easily controlling the optical amplifier 502.

[Sixth Embodiment]

Hereinafter, a network system 700 of a sixth embodiment and a control system 800 applied to the network system 700 will be described.

Figure 17:
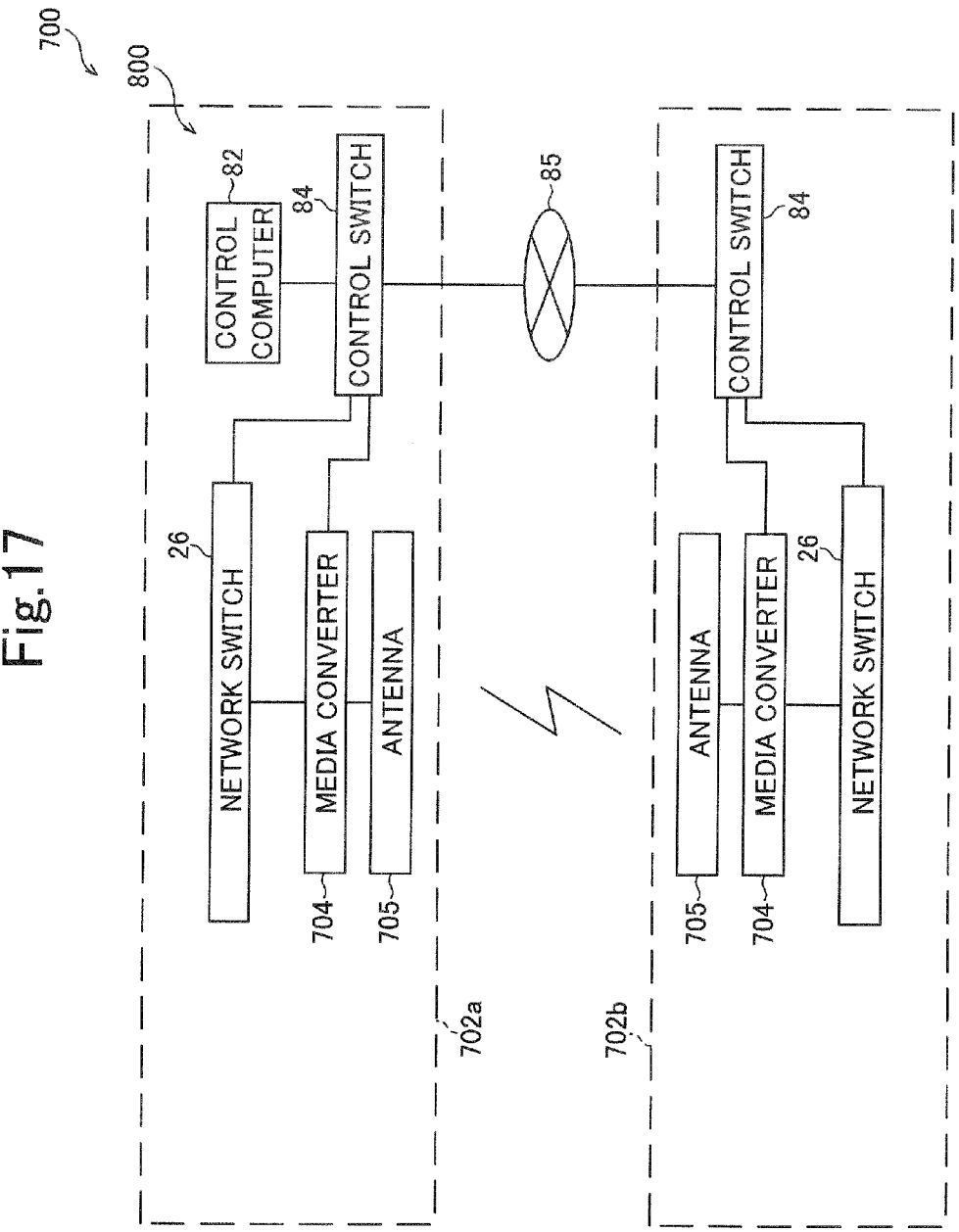
FIG. 17 is a block diagram showing a schematic structure of a network system including a control system of a sixth embodiment.

FIG. 17 is a block diagram showing a schematic structure of the network system 700. The network system 700 includes radio relay systems 702a, 702b. The radio relay systems 702a, 702b are installed in radio base stations of, for example, a telecommunications carrier.

The radio relay systems 702a, 702b form part of a wide area network and communicate by radio. For this purpose, media converters 704 are connected to antennas 705. The media converter 704 superimposes an electrical signal received from a network switch 26 on an electromagnetic wave (carrier). Then, the media converter 704 transmits the electromagnetic wave on which the electrical signal is superimposed to the opposed media converter 704 via the antenna 705. Upon receiving the electromagnetic wave on which the electrical signal is superimposed via the antenna 705, the media converter 704 extracts the electrical signal to transmit it to a network switch 26.

Figure 18:
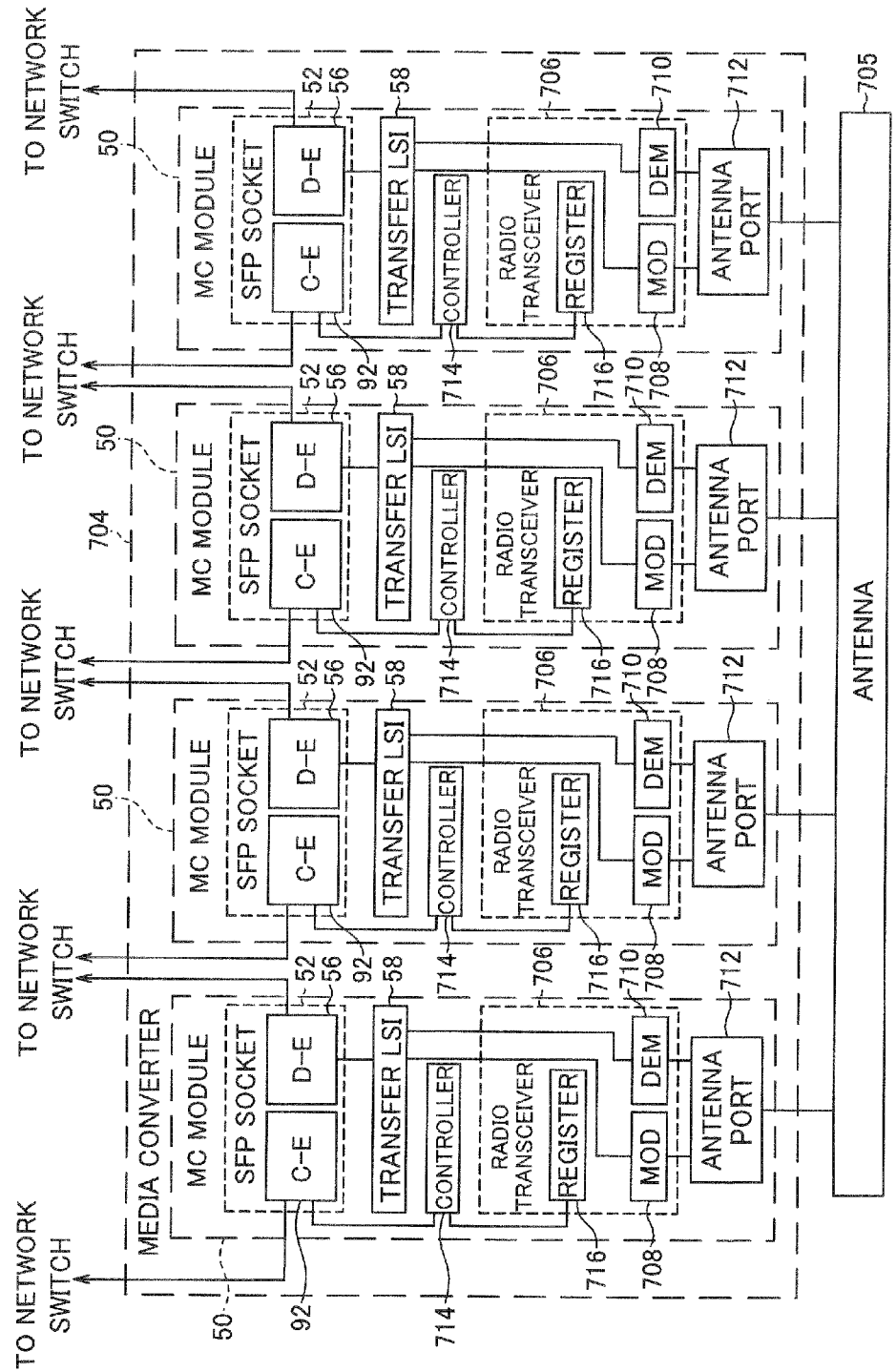
FIG. 18 is a block diagram showing a schematic structure of a media converter in FIG. 17.

FIG. 18 is a block diagram schematically showing a structure of the media converter 704. MC modules 50 of the media converter 704 each have a radio transceiver 706 instead of the long-distance-side optical transceiver 60.

The radio transceivers 706 each have a modulator (MOD) 708 and a demodulator (DEM) 710. The modulator 708 and the demodulator 710 are connected to an antenna port 712. The modulator 708 superimposes a transmission code being an electrical signal received from a transfer LSI 58 on an electromagnetic wave and transmits the resultant to the antenna port 712. The demodulator 710 extracts an electrical signal from an electromagnetic wave received via the antenna port 712 and transmits the extracted electrical signal to the transfer LSI 58.

Further, the MC modules 50 each have a controller 714. The controllers 714 are each, for example, an integrate circuit such as CPU. The radio transceivers 706 each include a register 716. Various parameters are readably written to the register 716. The controller 714 controls the radio transceiver 706 by writing a parameter to the register 716. Further, the controller 714 monitors a state of the radio transceiver 706 by reading the parameters in the register 716.

For example, a wavelength set value of a carrier is written as one of the parameters to the register 716. The modulator 708 and the demodulator 710 of the radio transceiver 706 set the wavelength of the carrier to a wavelength corresponding to the wavelength set value.

In this embodiment as well, a user interface for controlling the media converter 704 and a user interface 136 for controlling the network switch 26 are common. Configuration information 137 contains configuration information of the media converter 704. As a communication method of a control signal used for controlling the media converter 704, the same method as that in the first embodiment is usable.

In the control system 800 applied to the network system 700 of the above-described sixth embodiment, a controller 88 of the network switch 26 transmits control signals to the controllers 714 of the radio transceivers 706 based on commands from a control computer 82. When necessary, the controller 88 receives control signals from the controllers 714 to output the contents of the received control signals to the control computer 82.

According to this structure, as in the first embodiment, an administrator is capable of controlling the media converter 704 via the network switch 26 by using the user interface 136 for controlling the network switch 26.

The present invention is not limited to the above-described first to sixth embodiments and includes embodiments where changes are made in the first to sixth embodiments and embodiments where these embodiments are combined.

For example, in the first embodiment and the sixth embodiment, Ethernet frames containing the control signals may be transmitted/received through the control lines 108 of the communication cable 100. That is, in the first embodiment and the sixth embodiment as well, it is possible to communicate through reading and writing from/to the registers in conformity with the standard of I2C or MDIO as in the second to fifth embodiments. Further, in the first embodiment and the sixth embodiment as well, as in the second to fifth embodiments, the contents of control communication may conform to the standard such as IEEE802.1ag, IEEE802.3ah, or SNMP to control the media converters 28, 704.

Further, as is understood from the description of the first to sixth embodiments, a target controlled via the network switch being a network switch such as an L2 switch or an L3 switch is not limited to the media converter but may be another transmission device.

Here, the transmission device refers to a device or a module except a device having a route control function such as an L2 switch or an L3 switch, out of devices or modules used for the transfer of a user frame. The transmission device includes the media converter, the optical amplifier, and so on. The number of the transmission devices as control targets is not limited to one but may be plural.

Incidentally, depending on the kind of the transmission device, information controlled by the control system may differ and automatically set parameters also differ.

In the above-described first to sixth embodiments, the control signals are all transmitted as electrical signals between the network switches 26, 202, 302, 402, 602, 702 and the media converters 28, 204, 304, 404, 704 or the optical amplifiers 502, but they may be transmitted as optical signals. In this case, as a transmission medium for the control signal, an optical fiber is used.

What is claimed is:

1. A transmission device control system comprising:
   a control computer;
   a network switch including a control port and a controller;
   a transmission device including a controller;
   a first transmission medium connecting said control computer and the control port of said network switch; and
   a second transmission medium which transmits a control signal transmitted/received between the controller of said network switch and the controller of said transmission device,
   wherein:
   said control computer transmits a predetermined command to said network switch by using a user interface for controlling said network switch;
   the controller of said network switch transmits the control signal to the controller of said transmission device, based on the command transmitted from said control computer;
   the controller of said transmission device sets a parameter of said transmission device, based on the control signal transmitted from the controller of said network switch; and
   said control computer sets the parameter of said transmission device through said network switch.

2. The transmission device control system according to claim 1, wherein:
   said control computer includes a memory storing configuration information regarding specifications of said transmission device, and when control information regarding setting of said transmission device is input to said control computer by an administrator, said control computer transmits the command that is based on the control information and the configuration information, to the controller of said network switch;

the controller of said network switch transmits the control signal to the controller of said transmission device, based on the command transmitted from said control computer; and the controller of said transmission device sets the transmission device based on the control signal transmitted from the controller of said network switch.

3. The transmission device control system according to claim 1, wherein:

said network switch and said transmission device each comprise a socket including a data electrode and a control electrode; and the socket of said network switch and the socket of said transmission device are connected to each other via a communication cable which includes a data line and a control line, wherein the data line connects the data electrode of the socket of said network switch and the data electrode of the socket of said transmission device, and the control line connects the control electrode of the socket of said network switch and the control electrode of the socket of said transmission device.

4. The transmission device control system according to claim 1, wherein:

said network switch and said transmission device each comprise a socket including a data electrode; and the socket of said network switch and the socket of said transmission device are connected to each other via a communication cable which includes a data line as said second transmission medium, and wherein the data line connects the data electrode of the socket of said network switch and the data electrode of the socket of said transmission device.

5. The transmission device control system according to claim 1, wherein:

said network switch includes a plurality of ports each capable of transmitting/receiving a user frame;

one of the plurality of ports of said network switch is set as a control port to which said second transmission medium is connected;

said transmission device includes a control port and a port used for transmitting/receiving the user frame; and said second transmission medium is connected to the control port of said transmission device.

6. The transmission device control system according to claim 1, wherein:

said transmission device has a control port and a port used for transmitting/receiving a user frame; and the control port of said transmission device is connected to a port of said network switch via a control network including said first transmission medium and said second transmission medium.

7. The transmission device control system according to claim 2, wherein said transmission device transmits/receives a plurality of optical signals that are to be multiplexed or demultiplexed, and sets wavelengths of the optical signals based on the control signal.

8. The transmission device control system according to claim 3, wherein communication between the controller of said network switch and the controller of said transmission device conforms to a standard of Inter Integrated Circuit or Management Data Input/Output.

9. The transmission device control system according to claim 3, wherein:

communication between the controller of said network switch and the controller of said transmission device is performed through reading/writing from/to a register conforming to a standard of Inter Integrated Circuit or Management Data Input/Output; and contents of the communication between the controller of said network switch and the controller of said transmission device conform to one of standards of IEEE802.1ag, IEEE802.3ah, and Simple Network Management Protocol.

10. The transmission device control system according to claim 3, wherein:

said control computer includes a memory storing configuration information regarding specifications of said transmission device, and when control information regarding setting of said transmission device is input to said control computer by an administrator, said control computer transmits the command that is based on the control information and the configuration information, to the controller of said network switch;

the controller of said network switch transmits the control signal to the controller of said transmission device, based on the command transmitted from said control computer; and the controller of said transmission device sets the transmission device based on the control signal transmitted from the controller of said network switch.

11. The transmission device control system according to claim 10, wherein said transmission device transmits/receives a plurality of optical signals that are to be multiplexed or demultiplexed, and sets wavelengths of the optical signals based on the control signal.

12. The transmission device control system according to claim 4, wherein contents of communication between the controller of said network switch and the controller of said transmission device conform to one of standards of IEEE802.1ag, IEEE802.3ah, and Simple Network Management Protocol.

13. The transmission device control system according to claim 4, wherein:

said control computer includes a memory storing configuration information regarding specifications of said transmission device, and when control information regarding setting of said transmission device is input to said control computer by an administrator, said control computer transmits the command that is based on the control information and the configuration information, to the controller of said network switch;

the controller of said network switch transmits the control signal to the controller of said transmission device, based on the command transmitted from said control computer; and the controller of said transmission device sets the transmission device based on the control signal transmitted from the controller of said network switch.

14. The transmission device control system according to claim 13, wherein said transmission device transmits/receives a plurality of optical signals that are to be multiplexed or demultiplexed, and sets wavelengths of the optical signals based on the control signal.

15. The transmission device control system according to claim 5, wherein contents of communication between the controller of said network switch and the controller of said transmission device conform to one of standards of IEEE802.1ag, IEEE802.3ah, and Simple Network Management Protocol.

16. The transmission device control system according to claim 5, wherein:

said control computer includes a memory storing configuration information regarding specifications of said transmission device, and when control information regarding setting of said transmission device is input to said computer by an administrator, said control computer transmits the command that is based on the control information and the configuration information, to the controller of said network switch;

the controller of said network switch transmits the control signal to the controller of said transmission device, based on the command transmitted from said control computer; and the controller of said transmission device sets the transmission device based on the control signal transmitted from the controller of said network switch.

17. The transmission device control system according to claim 16, wherein said transmission device transmits/receives a plurality of optical signals that are to be multiplexed or demultiplexed, and sets wavelengths of the optical signals based on the control signal.

18. The transmission device control system according to claim 6, wherein contents of communication between the controller of said network switch and the controller of said transmission device conform to one of standards of IEEE802.1ag, IEEE802.3ah, and Simple Network Management Protocol.

19. The transmission device control system according to claim 6, wherein:

said control computer includes a memory storing configuration information regarding specifications of said transmission device, and when control information regarding setting of said transmission device is input to said control computer by an administrator, said control computer transmits the command that is based on the control information and the configuration information, to the controller of said network switch;

the controller of said network switch transmits the control signal to the controller of said transmission device, based on the command transmitted from said control computer; and the controller of said transmission device sets the transmission device based on the control signal transmitted from the controller of said network switch.

20. The transmission device control system according to claim 19, wherein said transmission device transmits/receives a plurality of optical signals that are to be multiplexed or demultiplexed, and sets wavelengths of the optical signals based on the control signal.

* * * * *